United States Patent [19]

Ahern et al.

[11] Patent Number: 4,809,803

[45] Date of Patent: Mar. 7, 1989

[54] DRIVE SYSTEM AND VEHICLE FOR USE THEREWITH

[75] Inventors: Charles J. Ahern, Lathrup Village; Bohdan W. Fedorowycz, Livonia; Martin J. Neumeyer, Utica, all of Mich.

[73] Assignee: General Dynamics-Land Systems, Warren, Mich.

[21] Appl. No.: 34,651

[22] Filed: Apr. 6, 1987

[51] Int. Cl.⁴ .............................................. B60K 17/30
[52] U.S. Cl. ..................... 180/65.4; 180/79; 280/771
[58] Field of Search ............... 180/22, 233, 65.1, 65.4, 180/236, 65.7, 79; 290/15, 27; 280/771

[56] References Cited

U.S. PATENT DOCUMENTS

| | | | |
|---|---|---|---|
| 3,171,505 | 3/1965 | Imelmann | 180/65.4 |
| 3,299,978 | 1/1967 | Sponsler | 180/22 |
| 3,812,928 | 5/1974 | Rockwell et al. | 180/65.5 |
| 3,915,251 | 10/1975 | Kassekert et al. | 180/65.1 |
| 4,022,290 | 5/1977 | Boyer | 180/22 |
| 4,089,384 | 5/1978 | Ehrenberg | 180/65.4 |
| 4,211,930 | 7/1980 | Fengler | 180/65.4 |
| 4,454,925 | 6/1984 | Oswald | 180/22 |

*Primary Examiner*—Richard A. Bertsch
*Attorney, Agent, or Firm*—Brooks & Kushman

[57] ABSTRACT

An electrical drive system is controlled by a microprocessor-based, electronic control unit which is coupled to operator-generated input signals and various feedback signals to individually control the major components of the drive system including a turbine engine, a three-phase alternator, power control units and their respective synchronous AC motors and gearboxes. A combat vehicle which utilizes the drive system includes a vehicle bed on which right and left sets of three wheels are mounted on opposite sides of the centerline of the vehicle in driving engagement with their respective gearboxes. Each of the wheels includes a hollow hub in which its gearbox and its synchronous AC motor is mounted. A torsilastic suspension system supports the wheels on the vehicle bed. The turbine engine drives the alternator which comprises a brushless, synchronous device having a variable three-phase power output. Each of the power control units first rectifies the three-phase output power, then controls the resulting DC power and finally converts the controlled DC power to variable frequency AC power to independently control the speed and torque of its motor. The vehicle turns by electrically slowing the motors on one side of the centerline of the vehicle and electrically speeding up the motors on the other side so that the vehicle turns about the wheels whose motors are electrically slowed (i.e. regenerative skid steering).

18 Claims, 6 Drawing Sheets

DRIVE SYSTEM AND VEHICLE FOR USE THEREWITH

TECHNICAL FIELD

This invention relates to electrical drive systems and vehicles for use therewith and, in particular, to electrical drive systems and vehicles for use therewith wherein the various components of the drive system are controlled from an electronic control unit responsive to operator-generated input signals and feedback signals indicating the condition of the various components of the drive system.

BACKGROUND OF THE INVENTION

The U.S. military has a continuing interest in wheeled armored vehicles. A comparison of wheeled and tracked vehicles reveals a major difference in silhouettes. As can be readily appreciated, a low silhouette offers many advantages in combat. The major contributing factors to this difference in silhouette are the automotive-type drive train and steering mechanisms used in conventional wheeled armored vehicles. Hydraulic and electrical drive systems potentially allow configurations competitive with silhouettes of tracked vehicles.

To achieve this advantage of a hydraulic or electrical drive system, the wheel drive motor should be located as near as possible to the wheels. In the case of hydraulic drive systems, this requires much piping, hydraulic rotating joints, and complex road arms. Steering wheels become a very difficult hydraulic problem. A speed range of 3 to 60 mph is difficult to achieve when 60% grade torque is required at the low end and highway conditions at the upper end. The components become very large and efficiency is low. Weight of pumps, fluids, control valves, piping and cooling also appears to be excessive. Controls for a 6×6 hydraulic system are quite involved. Cold weather (−45° F.) start up of a hydraulic system is time consuming. Reaction time to full power from idle is not fast. Momentary overloads, as might be required for evasive action, are not available with hydraulics because of pressure limitations. Consequently, there appears to be little advantage in pursuing the hydraulics drive train approach for a modern combat vehicle.

The state of the art in electric motors and their controls reveals a maturing technology in speed and torque control. There are a wide variety of types of electric drive motors, each with its own advantages and disadvantages. One of the most common types of drive motors is a stepper motor. This motor provides open loop position and velocity control. They are relatively low in cost and they interface easily with electronic drive circuits. Recent developments in control systems have permitted each stepper motor "step" to be divided into many incremental microsteps. As many as 10,000 or more microsteps per revolution can be obtained. Motor magnetic stiffness, however, is lower at these microstepping positions. Typically, stepper motors are run in an open loop configuration. In this mode they are underdamped systems and are prone to vibration, which can be damped either mechanically or through application of closed loop control algorithms. Power-to-weight ratios are lower for stepper motors than for other types of electric motors.

The permanent-magnet, direct-current, brush-commutated motor is widely available and comes in many different types and configurations. The lowest-cost permanent magnet motors are the ceramic (ferrite) magnet motors. Motors with alnico magnets have a higher energy product and produce higher motor constants than equivalent sized motors with ceramic magnets. (Motor constant is defined as torque produced divided by the square root of power consumed.) Rare-earth (samarium-cobalt) motors have the highest energy product magnets, and, in general, produce the largest peak torques because they can accept large currents without demagnetizing. However, these larger currents cause increased brush wear and more rapid motor heating.

Another subset of DC permanent-magnet brush motors are ironless rotor motors. Typicallly, these motors have rotors made of copper conductors enclosed in epoxy glass cup or disk rotor structures. The advantages of these motors include low inertia and negligible inductance, which reduces arcing, extends brush life, and results in short electrical and mechanical time constants. Because these motors have no iron in the rotor they have very little residual magnetism and consequently very low cogging torques. Disk-type motors have several advantages. They have short overall lengths, and because their rotors have many commutation segments they produce a smooth output with low torque ripple. A disadvantage of ironless armature motors is that they have a low thermal capacity due to low mass and limited thermal paths to their case. As a result, they have rigid duty cycle limitations or require forced-air cooling when driven at high-torque levels.

The weakest links in most motor designs are the bearings and brushes. Brushless DC motors, also classified as synchronous AC motors, have been developed. They substitute magnetic and optical switches and sensors nd electronic switching circuitry for the graphite brushes and copper bar commutators, thus eliminating the friction, sparking, and wear of commutating parts. Brushless DC motors generally have good performance at low cost because of the decreased complexity of the motor. However, the controllers for these motors are generally more expensive because they must include all of the switching circuitry. The cost, reliability and flexibility of such controllers, however, have also improved due to such features as improved semiconductor technology and the use of microprocessor control technology.

Brushless DC motors also have increased reliability and improved thermal capacity. This improved thermal capacity occurs because in brushless motors the rotor is a passive magnet and the wire windings are in the stator, giving them good thermal conductivity to the motor case.

The U.S. Pat. No. to Fengler 4,211,930 discloses a constant-speed, continuously-running, low-power diesel engine or turbine which drives a fixed-frequency, two-pase alternator, the output from which, for direct drive, flows to the stator pole piece windings of four independently-rotating stepping motors operating synchronously with the DC alternator. Each motor also includes a rotor having a plurality of circumferentially spaced, rare-earth magnets of alternating polarity. Each stepping motor is connected to its respective traction wheel of a motor vehicle, thereby propelled at a limited maximum speed sufficient to overcome normal wind resistance over a level road. The motors are connected to a suspension arm assembly and swivel around a hinge line at the center of the vehicle. In starting, during acceleration, and for propulsion at higher speeds, direct current from a storage battery is caused to pulsate and is added to the current from the alternator to the stepping motors. A solid state control circuit selectively controls the frequency of a variable frequency generator electrically connected to the pulse-responsive electrical power system to vary the frequency of the current supplied to the stepping motors and thus vary the vehicle speed. The frequency and phase of the stator currents are controlled through SCR's or thyristors to maintain the magnetic field and the maximum torque condition, independent of rotor speed or supply frequency. During idling, the alternating current from the alternator is rectified and recharges the battery. During braking, the consequent driving of the stepping motors causes them to generate alternating current which is rectified and returned to the battery. By varying the frequencies of the current delivered to the right side motors as compared with those delivered to the left side motors and vice versa, in response to the turning of the steering wheel in rounding a curve in the road, a differential action is obtained.

The U.S. Pat. No. to Ehrenberg 4,089,384 discloses a vehicle including a turbine-drive electric generator, and a plurality of independent motor-wheel systems. The AC voltage from the generator is rectified and the resulting DC voltage is supplied to the serially connected DC motors.

The U.S. Pat. No. to Kassekert et al 3,915,251 discloses an electric vehicle drive having a DC drive motor with shunt field control. A DC power supply is connected to the drive motor. Drive pulleys and belts transfer drive torque from the motor to the drive wheels.

The U.S. Pat. No. to Etienne 4,187,436 discloses an electric hybrid vehicle including driving wheels driven by an electric driving motor supplied with current by a battery. The battery is charged by an alternator which, in turn, is driven by an engine. The excitation winding of the alternator is controlled by a circuit which, in turn, is controlled by a circuit which monitors the state of the battery. Logic circuitry is also provided for controlling the engine.

SUMMARY OF THE INVENTION

An object of the present invention is to provide an electrical drive system that offers the reliability and ruggedness required of a military vehicle but still yields the small size and light weight needed to create a vehicle with a lower silhouette and increased agility.

Another object of the present invention is to provide a combat vehicle including an electrical drive system that is compatible with future electrical weapons systems.

Yet still another object of the present invention is to provide a vehicle including an electrical drive system that is reliable and relatively easy to maintain.

In carrying out the above objects and other objects of the present invention there is provided a drive system for use in a vehicle having left and right sets of wheels mounted on opposite sides of the centerline of the vehicle and adapted to be electrically driven from a source of mechanical power. Each of the wheels includes a hollow hub. The drive system includes left and right sets of wheel drive units. Each of the wheel drive units is connected within its respective hub for rotation of its respective wheel upon the application of drive torque. The system also includes left and right sets of electric drive motors. Each of said motors is connected to its respective drive unit within its respective hub for receiving electrical power and converting the electrical power into drive torque. An alternator is connected to the source of mechanical power for receiving the application of drive torque therefrom and converting the mechanical power into electrical power. Power control means is coupled to the alternator means and each of the motors. The power control means conditions and controls the electrical power received by each of the motors to independently control the speed and torque of each of the motors.

Further, in carrying out the above objects and other objects of the present invention, the above-noted drive system is supported on a vehicle bed by a suspension system.

Preferably, the alternator, the power control means, the drive units and the source of mechanical power are centrally controlled by an electronic control unit responsive to operator-generated input signals and to feedback signals from the alternator, the power control means and each of the motors.

The drive system and vehicle for use therewith as constructed above has numerous advantages. For example, the electrical drive system offers the reliability and ruggedness required of a military vehicle and still yields the small size and light weight needed to create a vehicle with a lower silhouette and increased agility. Also, the electrical drive system provides a ready source of electrical power for future weapon systems. The use of an electronic control unit provides the necessary control for a responsive drive system of the sophistication needed for increased vehicle control, mobility and agility. Also, such an electronic control unit allows the use of electronic braking, regenerative skid steering, cruise control, anti-skid and fault diagnostics.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
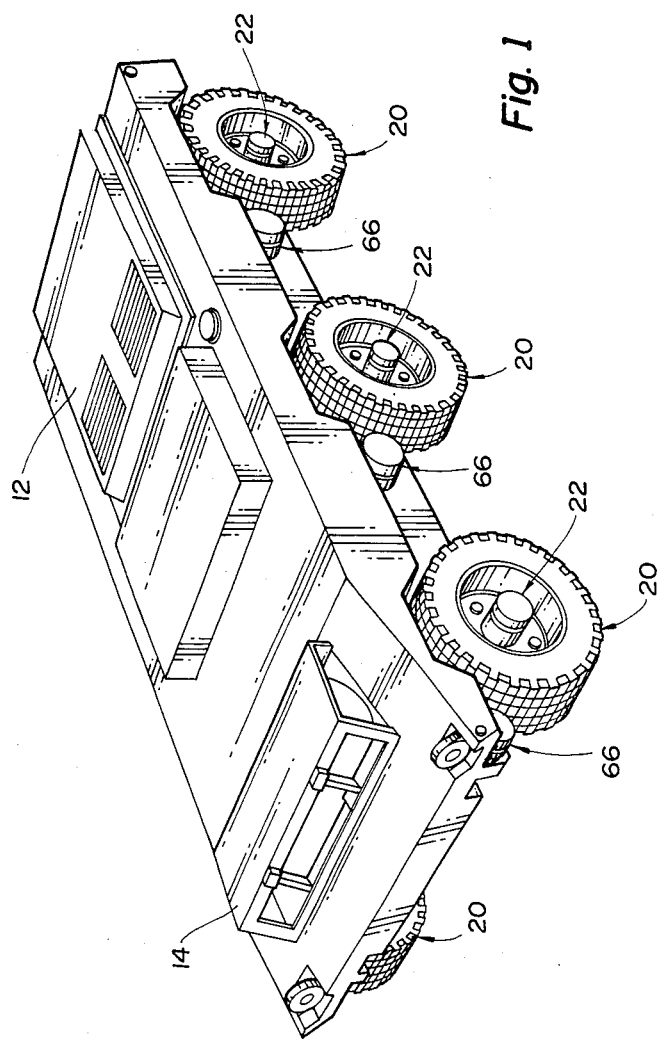
FIG. 1 is a perspective view of a vehicle test bed, including an electrical drive system, constructed in accordance with the present invention.
Figure 2:
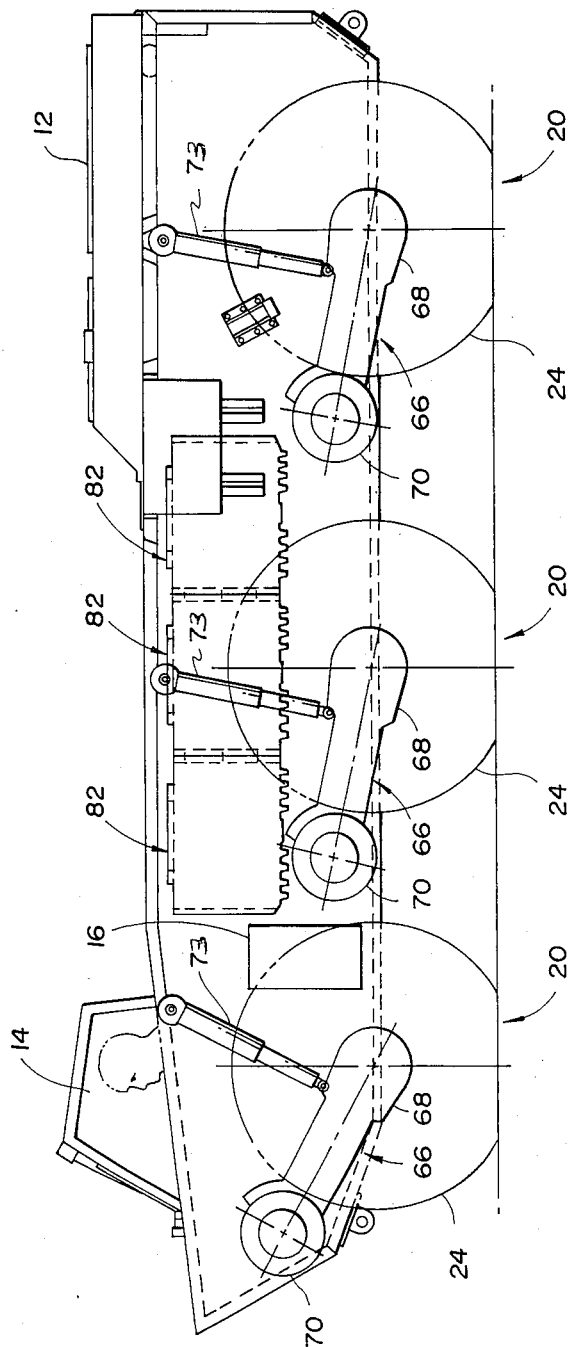
FIG. 2 is a side view of the vehicle test bed with many components thereof indicated by phantom lines.
Figure 3:
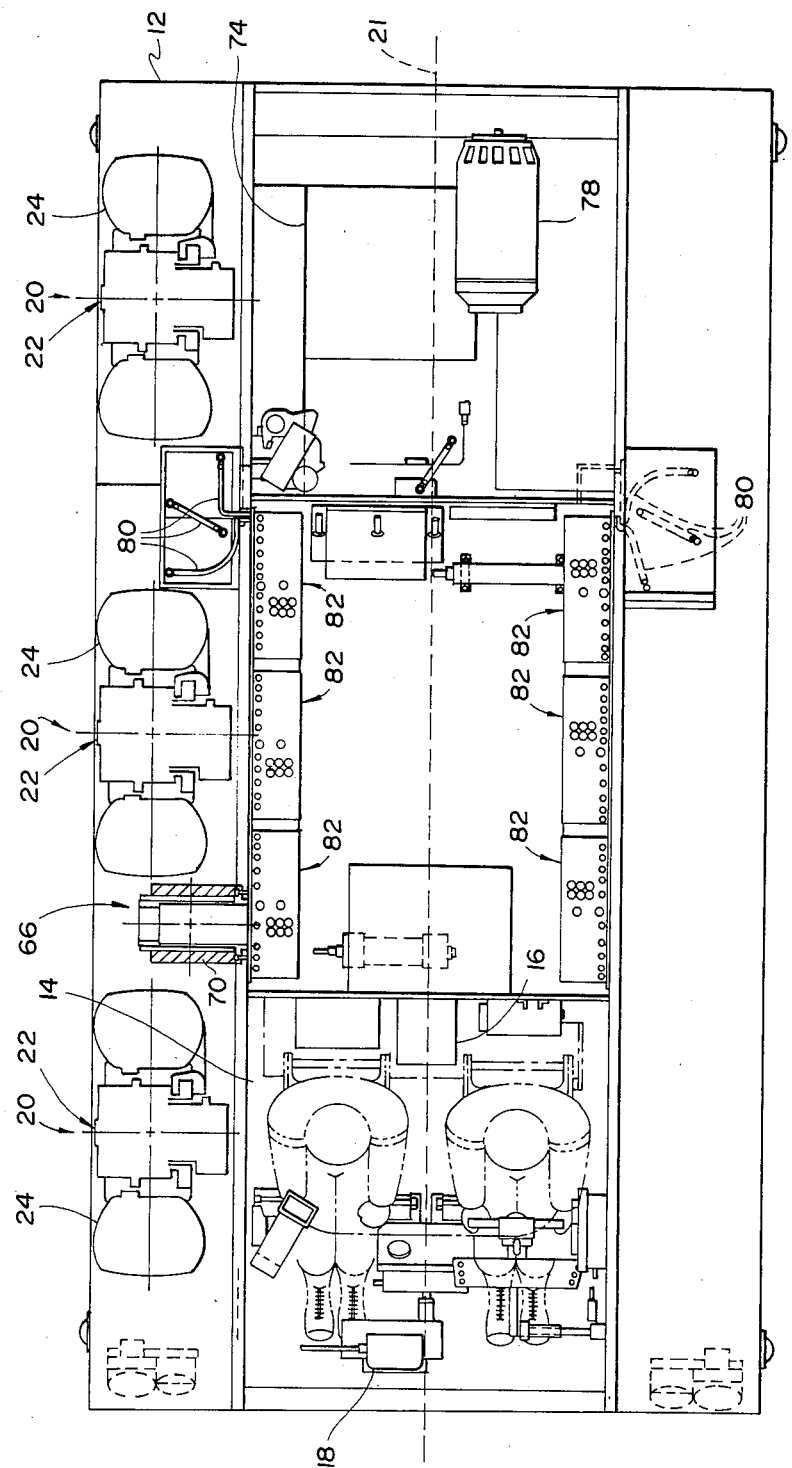
FIG. 3 is a top view of the vehicle test bed illustrating, by phantom lines, the layout of the various components of the drive system and their relationship with other components of the vehicle.

Referring now to FIGS. 1 through 3, there is illustrated an armor-plated vehicle, including an electrical drive system, constructed in accordance with the present invention. While illustrated as a vehicle with six wheels, the vehicle, collectively indicated at 10, could also be a vehicle having tracks or a different number of wheels.

While illustrative only, the vehicle 10 is approximately 18 feet long, 10 feet wide and five feet high, thereby providing a relatively low profile or silhouette. Also, because the vehicle 10 is electrically driven as described hereinbelow, there is sufficient on-board electrical power to handle future electrical weapon systems, for example, on the top surface of a vehicle bed 12 of the vehicle 10.

One or more operators are capable of being seated in a cockpit area 14. Within the cockpit area 14 there are provided manual speed, steering and brake controls as well as an engine switch. These operator controls are preferably capable of generating analog electrical signals which are processed by an electronic control unit, generally indicated at 16, also located in the cockpit area 14. In general, the electronic control unit 16, as will be described in greater detail hereinbelow, controls many of the components of the drive system. The control unit 16 also displays a variety of operator information on a monitor/display 18, also within the cockpit area 14.

Figure 4:
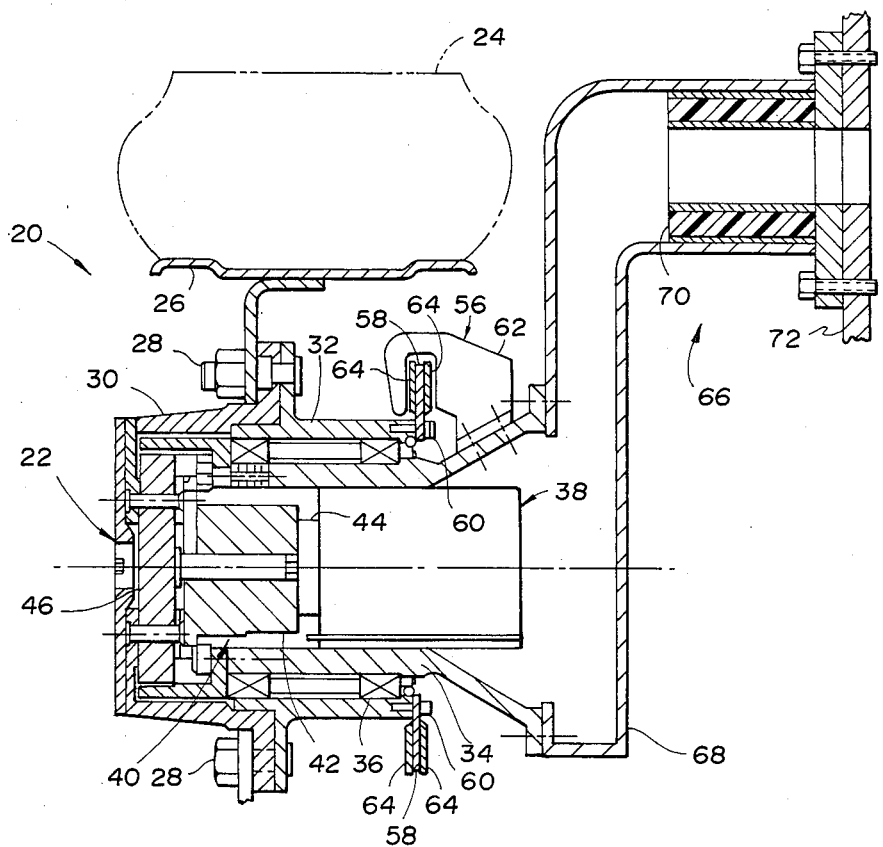
FIG. 4 is a view, partially broken away and in cross section, illustrating a gearbox and its associated electric motor positioned within the hub of a wheel of the vehicle and its related suspension unit.

The vehicle 10 has left and right sets of wheels, generally indicated at 20, supported on opposite sides of a centerline 21 of the vehicle bed 12. As best shown in FIG. 4, each wheel includes a hollow hub, generally indicated at 22. A tire, illustrated by phantom lines at 24, is mounted on a rim 26 of each wheel 20. In turn, each rim 26 is fixedly mounted by bolt and nut assemblies 28 to outer wheel housing members 30 and 32 of the hub 22. The housing members 30 and 32 rotate together with its respective tire 24.

The housing members 30 and 32 of each hub 22 rotate relative to and support their respective motor housing 34 by means of bearings 36. In turn, each motor housing 34 supports a synchronous AC motor, generally indicated at 38. An output shaft 39 of each synchronous AC motor 38 is in driving engagement with a two-speed gearbox, generally indicated at 40. Each gearbox 40 includes a shiftbox 42 which is controlled by the electronic control unit 16 to drive its hub 22 from either a high speed gear 44 or a low speed gear 46.

Figure 5:
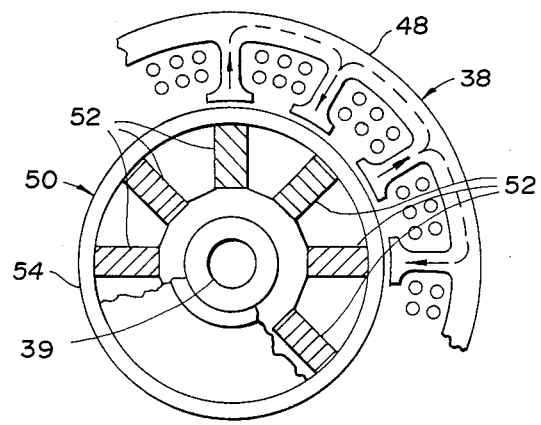
FIG. 5 is a view, partially broken away and in cross-section, illustrating an electric motor for use in the drive system.
Figure 6:
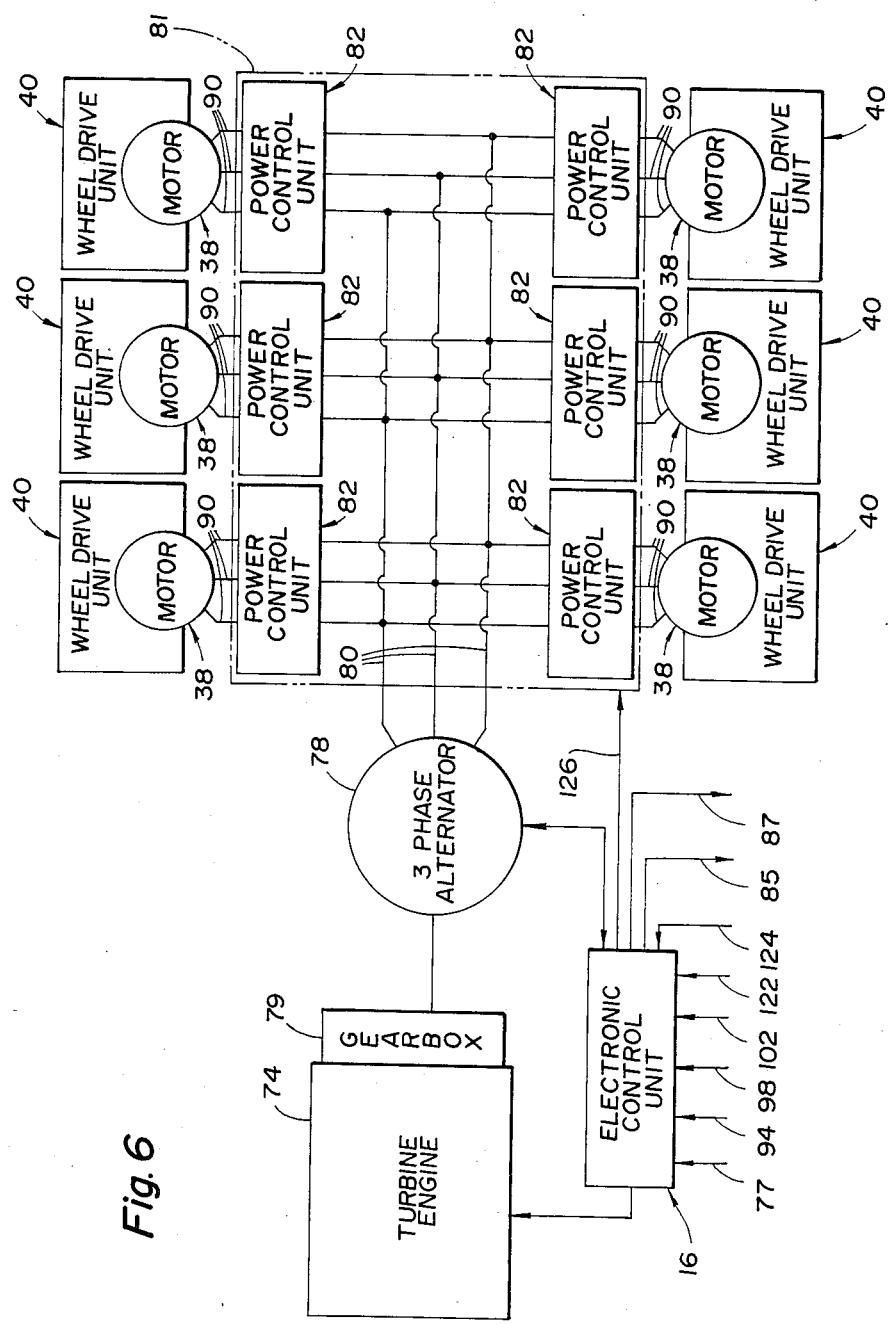
FIG. 6 is a schematic view of the various components of the vehicle drive system and the flow of power therebetween.

Referring to FIG. 5, each of the motors 38 includes a three-phase, oil-cooled stator or stator assembly 48 and a rotor or rotor assembly, generally indicated at 50. Preferably, the rotor 50 has a multiplicity of rare earth permnent magnets 52 circumferentially arranged and supported between the output shaft 39 and a support sleeve 54.

Referring again to FIG. 4, each wheel 20 includes a brake assembly, generally indicated at 56. Each brake assembly 56 includes an annular braking member 58 which is fixedly secured to the second housing member 32 such as by a plurality of bolts 60. Each brake assembly 56 also includes a hydraulically actuated braking device 62 which selectively engages brake pads 64 of the braking member 58 upon the generation of a brake signal by the operator of the vehicle 10. The braking device 62 is fixedly secured to the motor housing 34, such as by bolts (not shown).

A torsilastic suspension system supports the wheels 20 on the vehicle bed 12. In particular, the suspension system includes suspension units, generally indicated at 66, for each of the wheels 20. Each suspension unit 66 includes a road arm 68 fixedly connected at one end thereof to its motor housing 34 by bolts (not shown). The opposite end of each road arm 68 is conventionally mounted about a rubber element 70 of its suspension unit 66. Each tubular element 70, in turn, is fixedly mounted to a portion 72 of the vehicle bed 12. In general, the torsilastic suspension system operates in a conventional fashion to support the wheels 20 on the vehicle bed 12.

As best shown in FIG. 2, the suspension system also includes shock absorbers 73 for each of the wheels 20. One end of each shock absorber 73 is pivotally connected to the vehicle bed 12 and its opposite end is pivotally connected to its respective road arm 68.

Figure 7:
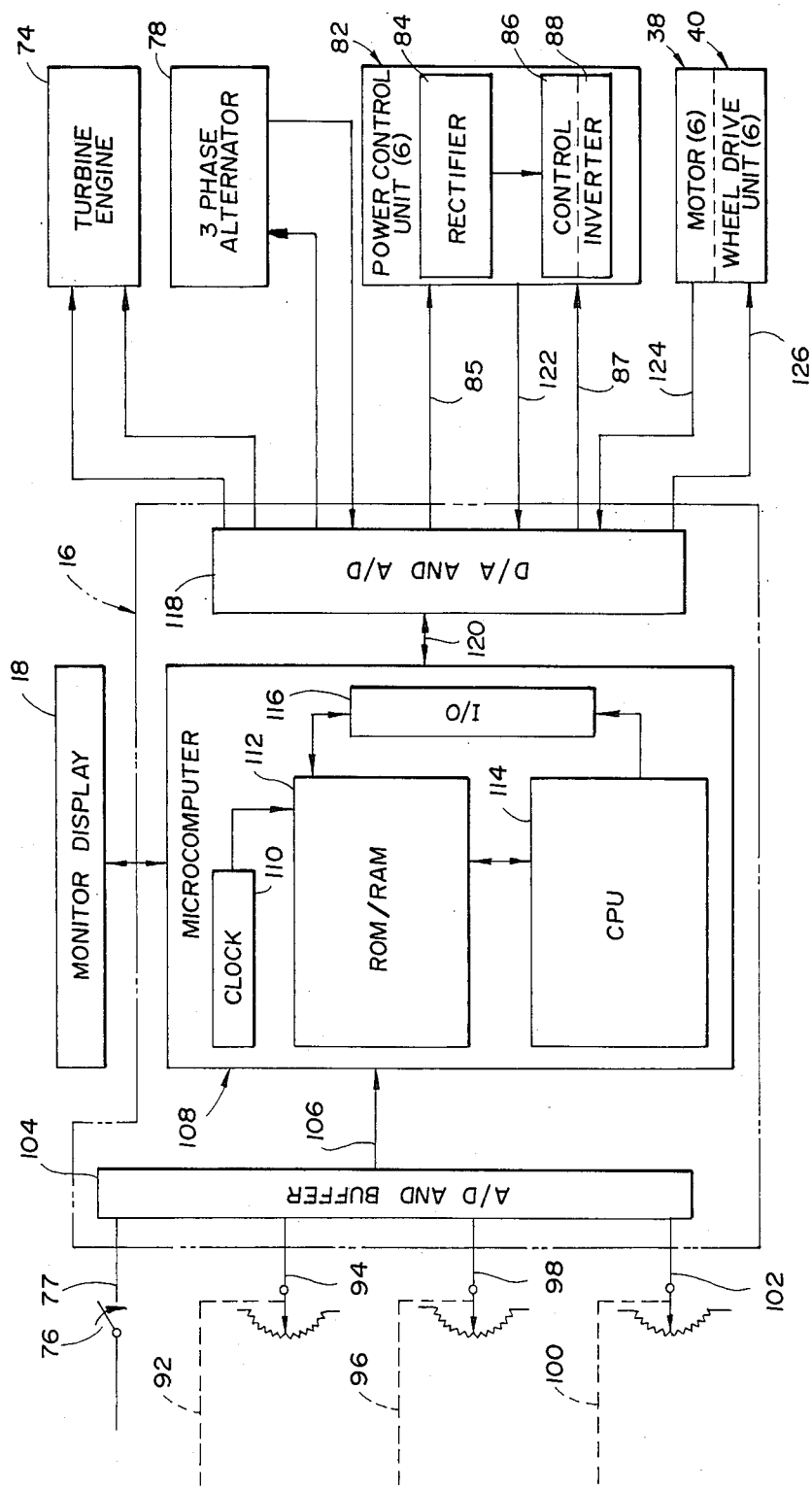
FIG. 7 is a schematic view of a microprocessor-based, electronic control unit, the various inputs and outputs thereof and the flow of control and feedback signals therebetween.

The vehicle 10 is driven from a source of mechanical power, preferably comprising a turbine engine 74 mounted on the vehicle bed 12. An on/off switch 76, as illustrated in FIG. 7, is located on an operator control panel within the cockpit 14 and is coupled on line 77 to the control unit 16 which, in turn, alternately stops or starts the engine 74. Preferably, the switch 76 is provided as a closed, isolated relay contact to the electronic control unit 16. Another input to the control unit 16 may indicate that the engine 74 is at or above its minimum operational speed and is available for load application.

The vehicle 10 also includes a brushless, synchronous alternator 78 which is mounted on the vehicle bed 12 and is in driving engagement with the turbine engine 74 through a gearbox 79. Preferably, the alternator 78 comprises a brushless, three-phase, synchronous machine having a rotating rectifier main exciter and a self-contained permanent magnet exciter for regulator power supply. Also, preferably, the alternator speed at engine idle is approximately 2,800 rpm and alternator speed at rated engine power is approximately 9,000 rpm. 2,800 rpm represents the minimum operational speed at which the maximum load does not exceed 100 shaft hp. Preferably, the alternator 78 is lubricated by the flow of pressurized oil and is cooled by a fan internal to the alternator 78.

The alternator 78 provides a three-phase, power output to shielded power leads 80. The power leads 80 are coupled to a power control means or circuit, generally indicated at 81, for conditioning and controlling the electrical power delivered to each of the motors 38. The power control circuit 81 includes power control units, generally indicated at 82, for each of the motors 38. Each power control unit 82 independently controls the speed and torque of its motor 38. Preferably, each of the power control units 82 is oil-cooled and is what is commonly known as a DC link converter. However, it is to be understood that other types of power control units could be provided.

Each power control unit 82 preferably includes a three-phase rectifier circuit 84 for converting the three-phase AC power from the alternator 78 to DC power. The DC power is then coupled to a control circuit 86 which is responsive to a set of control signals from the electronic control unit 16 on line 85 for individually controlling the DC power and, in particular, the DC current and the DC voltage. Finally, the controlled DC power is coupled to an inverter circuit 88 which is responsive to a second set of control signals appearing on line 87 from the electronic control unit 16. The inverter circuit 88 converts the controlled DC power from the control circuit 86 to a variable frequency, AC power. In turn, the AC power is coupled to the stator 48 of its respective motor 38 on output leads 90.

Referring again to FIG. 7, operator-generated speed commands (i.e. forward, neutral and reverse) appear on line 92 to provide an analog electrical signal appearing on line 94. Similarly, an operator-generated, steering command signal appears on line 96 and is converted into a corresponding analog electrical signal appearing on line 98. Likewise, an operator-generated brake command signal appears on line 100 and is converted to an analog electrical signal appearing on line 102.

Each of the signals appearing on the lines 94, 98 and 102 are converted to a digital representation by an analog-to-digital and buffer circuit 104 of the electronic control unit 16. In turn, the corresponding digitized signls appear on line 106 and are fed into a microcomputer, generally indicated at 108, of the electronic control unit 16. Preferably, the microcomputer 108 includes a clock 110, a memory circuit 112 having a volatile RAM and a non-volatile ROM, a CPU 114 and input and output circuitry 116 which are all interconnected and controlled in a conventional fashion. While illustrated as a microcomputer 108, it is to be understand that other types of control logic could be provided within the electronic control unit 16.

The electronic control unit 16 further includes a digital-to-analog and an analog-to-digital circuit 118 which interfaces the microcomputer 108 along bi-synchronous link 120 to the engine 74, the three-phase alternator 78, each of the power control units 82 and their respective motors 38 and wheel drive units 40. For example, the circuit 118 provides throttle and on-off control signals to the turbine engine 74. Also, the circuit 118 provides an excitation (EFA) control signal to the alternator 78 and receives a speed/voltage feedback signal from the alternator 78. Likewise, the circuit 118 receives voltage and current feedback signals from each of the power control units 82 on line 122 which the microcomputer 108 uses to control each of the power control units 82 in accordance with ciontrol algorithms, shaping algorithms, event algorithms and monitor and diagnostic algorithms provided as its control logic. In this way, the microcomputer 108 can accept various operator-generated input signals and feedback signals and output appropriate control signals to the various components of the vehicle drive system.

In similar fashion, speed feedback signals from each of the motors 38 are fed into the circuit 118 along line 124. Depending on the speed of each of the motors 38 and the control algorithms within the microcomputer 108, a low/high gear control signal is fed to each of the wheel drive units 40 on line 126 to selectively shift the wheel drive units 40 between high and low speed.

In summary, the electronic control unit 16 generates control and speed signals for each of the power control units 82, each of the wheel drive units 40, the alternator 78 and the turbine engine 74. In general, these signals are in response to operator-generated throttle, brake and steering commands, various feedback signals from the various components of the drive system and operator-selected mode signals (i.e. forward, reverse, neutral, pivot, etc.). The main functions performed by the electronic control unit 16 are (1) engine speed and alternator regulation to minimize fuel consumption; (2) individual inverter voltage/frequency control; (3) individual wheel spin/slide control; (4) power parameter limiting; (5) status/fault annunciation; (6) implementation of steering commands; (7) implementation of braking commands; and (8) electronic braking control (both dynamic and regenerative).

For example, regenerative skid steering is provided when each of the power control units 82 receives control signals from the electronic control unit 16 so that the motors 38 on one side of the vehicle 10 are slowed and the motors 38 on the other side of the vehicle are sped up. The motors 38 on the one side of the vehicle 10 slow the rotation of their respective wheels and thereby these motors 38 generate electrical power. The motors 38 on the other side of the vehicle 10 increase the rotation of their respective wheels 20 as these motors 38 are driven with increased electric power.

The advantages accruing to a drive system and a vehicle for use therewith as constructed above are numerous. For example, the electrical drive system provides a ready source of electrical power for future electrical weapon systems. Also, the use of an electronic control unit provides the necessary control for a responsive drive system of the sophistication needed for increased vehicle control, mobility and agility. Also, the electronic control unit allows the use of electronic braking, regenerative skid steering, cruise control, anti-skid and fault diagnostics.

The electrical drive system offers the reliability and ruggedness required of a military vehicle yet still yields the small size and light weight needed to create a vehicle with a low silhouette and increased agility.

While the best mode for carrying out the invention has herein been described in detail, those familiar with the art to which this invention relates will recognize various alternative designs and embodiments for carrying out the invention as defined by the following claims.

What is claimed is:

1. A vehicle bed comprising:
   a vehicle bed;
   right and left sets of wheels mounted on opposite sides of the centerline of the vehicle, each of said wheels including a hollow hub;
   a source of mechanical power mounted on the vehicle bed;
   a suspension system for supporting the wheels on the vehicle bed;
   right and left sets of wheel drive units, each of said wheel drive units being connected within its respective hub for rotation of its respective wheel upon the application of drive torque;
   right and left sets of electric drive motors, each of said motors being connected to its respective drive unit within its respective hub for receiving electrical power and converting the electrical power into drive torque;
   an alternator mounted on the vehicle bed and connected to the source of mechanical power for receiving the application of drive torque therefrom and converting the mechanical power into electrical power; and
   power control means mounted on the vehicle bed and coupled to the alternator and each of the motors, wherein said power control means conditions and controls the electrical power received by each of the motors to independently control the speed and torque of each of the motors wherein said power control means is responsive to power control signals to control the motors to provide regenerative skid steering, one of the sets of motors slowing rotation of its respective set of wheels, the one set of motors generating electric power, and the other set of motors increasing rotation of its respective set of wheels, the other set of motors being driven with increased electric power.

2. The invention as claimed in claim 1 wherein said alternator is a brushless, synchronous device responsive to a set of alternator control signals and having a variable three-phase power output.

3. The invention as claimed in claim 2 wherein each of said motors is a synchronous AC motor.

4. The invention as claimed in claim 3 wherein each of said motors has a three-phase stator and a rotor with a multiplicity of permanent magnets.

5. The invention as claimed in claim 4 wherein said magnets are rare earth permanent magnets.

6. The invention as claimed in claim 3 wherein said power control means includes a power control unit for each of said motors, and wherein each of said power control units includes a three-phase rectifier circuit for converting the three-phase AC power from the alternator to DC power.

7. The invention as claimed in claim 6 wherein each of said power control units includes a control circuit responsive to a first set of power control signals for controlling its respective DC power.

8. The invention as claimed in claim 7 wherein each of said power control units includes an inverter circuit responsive to a second set of control signals for converting the controlled DC power to AC power, said AC power being coupled to its respective motor to control its torque and speed.

9. The invention as claimed in claim 1 wherein the vehicle has a first set of three wheels mounted at spaced locations on one side of the centerline and a second set of three wheels mounted on the opposite side of the centerline.

10. The invention as claimed in claim 1 wherein each of said drive units includes a variable speed gearbox mounted within its respective hub, each gearbox being responsive to a set of drive control signals to control its speed and wherein each of said drive motors includes an output shaft coupled to its respective gearbox within its respective hub to transfer drive torque thereto.

11. The invention as claimed in claim 10 wherein each of said gearboxes is a two-speed gearbox.

12. The invention as claimed in claim 1 wherein the source of mechanical power is a turbine engine and wherein said turbine is responsive to a set of engine control signals.

13. The invention as claimed in claim 12 including gearing for coupling the turbine engine to the alternator.

14. The invention as claimed in claim 1 wherein the vehicle is an electrically driven combat vehicle.

15. An electrically driven combat vehicle comprising:
a vehicle bed;
right and left sets of three wheels, the sets being mounted on opposite sides of the centerline of the vehicle, each of said wheels including a hollow hub;
a source of mechanical power including a turbine engine mounted on the vehicle bed;
a suspension system for supporting the wheels on the vehicle bed;
right and left sets of three drive units, each of said drive units including a gearbox connected within its respective hub for rotation of its respective wheel upon the application of drive torque;
right and left sets of three synchronous AC motors, each of said motors being connected to its respective gearbox within its respective hub, each of said motors having a three-phase stator and a rotor with a multiplicity of rare-earth permanent magnets;
a brushless, synchronous alternator mounted on the vehicle bed and connected to the turbine engine for receiving the application of drive torque therefrom and converting the mechanical power into a variable, three-phase output power; and
power control means mounted on the vehicle bed and coupled to the alternator and each of the motors, wherein said power control means conditions and controls the electrical power received by each of the motors to independently control the speed and torque of each of the motors and wherein said power control means controls one set of the motors so that the one set of motors slows rotation of its respective set of wheels, the one set of motors generating electric power, and the other set of motors increasing rotation of its respective set of wheels, the other set of motors being driven with increased electric power to thereby provide regenerative skid steering.

16. The invention as claimed claim 1 or claim 15 wherein the source of power, the alternator, the power control means and each of the drive units are responsive to control signals and wherein the invention further comprises an electronic control unit responsive to operator-generated input signals and feedback signls from the alternator, the power control means and each of the motors for providing said control signals.

17. The invention as claimed in claim 1 or claim 15 wherein said suspension system includes a suspension unit for each of said wheels and wherein each of said suspension units has a road arm and a torsilastic spring connected to its respective road arm.

18. The invention as claimed in claim 17 wherein said suspension system further includes a shock absorber connected to each of said road arms.

* * * * *